Patented Aug. 7, 1934

1,969,608

UNITED STATES PATENT OFFICE 1,969,608

PROCESS FOR THE MANUFACTURE OF OESTRUS HORMONE

Ernst Paul Häussler, Riehen, near Basel, Switzerland, assignor to Hoffmann-La Roche Inc., Nutley, N. J., a corporation of New Jersey No Drawing. Application June 9, 1932, Serial No. 616,355. In Germany July 25, 1931

1 Claim. (Cl. 167—74)

The adsorptive power of the oestrus hormone has been made use of for obtaining this hormone from the urine of the pregnant by means of animal charcoal (Klinische Wochenschrift, vol. 6, 1927, page 1319 and following). It was however not possible to regain the hormone from the charcoal adsorbate with the aid of organic solvents, such as alcohol, ether or chloroform, in which it is easily soluble. By extraction with amyl alcohol about 30 to 40% and by further extraction with chloroform again about 20 to 40% of the hormone, on the whole about 65%, could be regained from the charcoal adsorbate (Klinische Wochenschrift, vol. 9, 1930, page 1436 and following).

It has now been found that the oestrus hormone adhering to the animal charcoal can be to a great extent regained by dissolving with a mixture of methyl alcohol and chloroform. With this solvent mixture the yields are a great deal better, than by extraction with one solvent alone or subsequent extraction with two different solvents separately.

Example 1

7 liters of urine from pregnant women are stirred with 80 grammes of animal charcoal, which is added slowly in small quantities, for a few hours. After filtration by suction, washing and drying the charcoal one half of it is extracted with chloroform, the other half with a mixture of 3 parts of chloroform and 4 parts of methyl alcohol in a Soxhlet apparatus. After the solvent has been evaporated one obtains 1.4 grammes of the chloroform extract with an activity of 1 rat unit=3.6 mg., and 4.8 grammes of the chloroform-methyl alcohol extract with an activity of 1 rat unit=2.2 mg. This corresponds to a yield of 110 rat units in the first and to a yield of 620 rat units per liter in the second case.

Example 2

7 liters of urine from a pregnant mare are stirred with animal charcoal in the manner described in Example 1. The dried charcoal is divided into three equal parts, $a$, $b$ and $c$, part $a$ extracted with methyl alcohol, part $b$ with chloroform, and part $c$ with a mixture of chloroform and methyl alcohol. One obtains:

2.46 grammes of extract $a$ with an activity of 1 rat unit=more than 0.5 mg.
1.09 grammes of extract $b$ with an activity of 1 rat unit=more than 0.2 mg.
7.54 grammes of extract $c$ with an activity of 1 rat unit=0.8 mg.

The solvent mixture consisting of chloroform and methyl alcohol therefore yields more than double the quantity of hormone obtained with the single solvent.

Example 3

(a) 2.5 liters of ox gall are stirred with animal charcoal. After separating the charcoal adsorbate (I) the gall is acidified with hydrochloric acid and again stirred with animal charcoal (adsorbate II).

By extraction with alcohol about 100 rat units are obtained from charcoal adsorbate I, about 25 rat units from charcoal adsorbate II.

The gall contained 80 to 90 rat units per liter, as estimated by direct extraction with ether.

(b) 2.5 liters of cow gall containing about 50 rat units per liter are stirred with animal charcoal at first in neutral and then in acidified condition.

Charcoal adsorbate I (neutral) extracted with alcohol, yields about 55 rat units, charcoal adsorbate II (acidified with hydrochloric acid), extracted with a chloroform-methyl alcohol mixture, about 100 rat units.

I claim:

In a process for preparing the oestrus hormone in which the hormone obtained from some source is adsorbed by charcoal, the step of extracting the adsorbate with a solvent consisting of a mixture of methyl alcohol and chloroform.

ERNST PAUL HÄUSSLER.